Nov. 28, 1933.  W. H. NEAL  1,936,968
UNIVERSAL WORKHOLDING ATTACHMENT FOR VISES
Filed Nov. 9, 1932
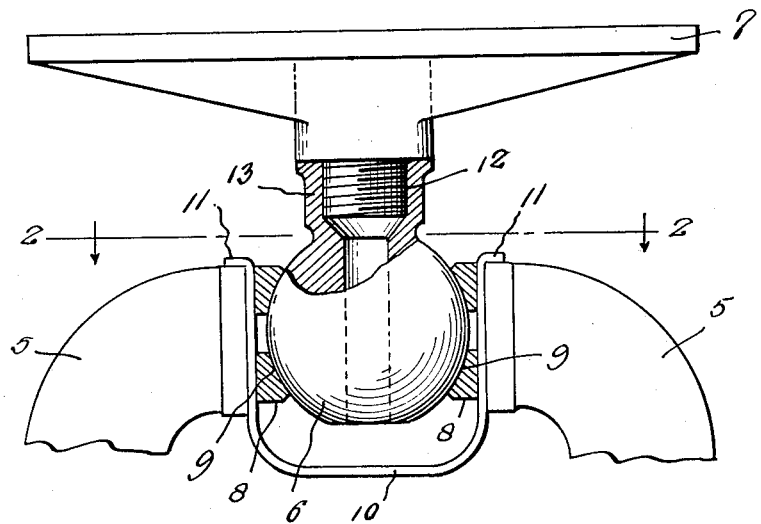
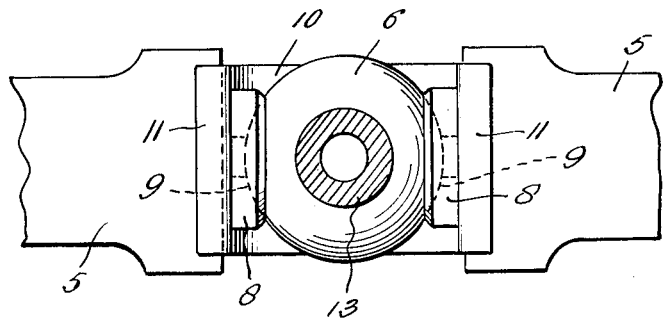
William H. Neal,
INVENTOR.
BY J. Stanley Burch
ATTORNEY.

Patented Nov. 28, 1933

1,936,968

UNITED STATES PATENT OFFICE 1,936,968

UNIVERSAL WORKHOLDING ATTACHMENT FOR VISES

William H. Neal, Syracuse, N. Y.

Application November 9, 1932. Serial No. 641,904

2 Claims. (Cl. 81—38)

This invention relates to an improved workholding attachment for vises, and the primary object of the present invention is to provide a device of this kind by means of which the work holder proper may be readily turned or tilted to any desired adjusted position relative to the vise jaws and held with the desired security in such position, for most efficiently presenting the work to the operator for facilitating operation thereon.

More particularly, the present invention aims to provide a simple and efficient attachment by means of which an ordinary vise may be converted into an efficient work holder for use by jewelers, engravers, and other craftsmen, and wherein a work holder proper may be readily turned or tilted so as to have substantially universal adjustment relative to the jaws of the vise for properly presenting the work to the operator.

Other objects and features of the invention will become apparent from the following description when considered in connection with the accompanying drawing, in which:

Figure 1 is an elevational view, partly broken away and in section, showing a vise attachment constructed in accordance with the present invention operatively associated with the jaws of a vise; and Figure 2 is a horizontal section on line 2—2 of Figure 1.

Referring in detail to the drawing, 5 indicates the opposed jaws of an ordinary or conventional bench or machine vise which have opposed vertical faces, and which are suitably adjustable toward and from each other in a well known manner. The present invention includes a ball member 6 preferably formed of hardened steel, and carrying a suitable work-holder 7. Mounted on the faces of the jaws 5 of the vise so as to be incapable of turning relative to said jaws, are a pair of opposed disks or plates 8 having segmento-spherical recesses 9 in the inner faces thereof to receive the opposite sides of the ball member 6 and thereby form a socket for said ball member 6 in which the latter is capable of substantially universal adjustment. Obviously, by adjusting the vise jaws 5 toward each other, the disks 8 will be brought into tight gripping engagement with opposite sides of the ball member 6 so as to effectively retain it in any adjusted position relative to the vise jaws, the work-holder 7 being correspondingly held in adjusted position. By varying the degree of adjustment of the jaws 5 toward each other, the rigidity with which the ball member 6 is held against adjustment may be controlled by the operator. For instance, frictional resistance to movement of the ball member 6 and work-holder 7 relative to the disks 8, may be had by adjusting the vise jaws 5 toward each other so that said disks 8 do not tightly grip the opposite sides of ball member 6. At the same time, by adjusting the vise jaws 5 toward each other so that the ball member 6 is tightly gripped between the disks 8, positive prevention of accidental movement of the ball member 6 and work-holder 7 is had. To facilitate frictional resistance to movement of ball member 6 when not tightly gripped between disks 8, the latter are preferably made of relatively soft metal.

Any suitable means may be provided for mounting the disks 8 on the faces of the vise jaws 5 against turning relative to the latter. As shown, this means consists of a metal bar or frame 10 of U-shape which connects the disks 8 and which has outturned end flanges 11 adapted to rest upon the vise jaws 5 as clearly shown, the disks 8 being suitably provided rigid with and upon the inner sides of the legs of the frame member 10.

The work-holder 7 may be any one of several kinds now in use to hold different kinds of work, or may be specially designed. As shown, it embodies a relatively large horizontal plate having a depending stem 12 whose reduced lower end is removably threaded into an upstanding tubular shank 13 rigid with ball member 6. The wide contacting surfaces of the larger upper end of stem 12 and the upper end of shank 13 present sufficient friction to prevent accidental turning of stem 12 and work-holder 7 relative to the shank 13 when stem 12 is entirely threaded into shank 13.

From the foregoing description, it will be understood that the work-holder 7 may consist of a plate, vise, clamp, stud, or other appliance. As will be apparent, the work-holder can be turned or tilted to various angles and positions relative to the vise jaws, and held semi-rigid or rigid at the option of the operator by simply manipulating the vise to secure the degree of rigidity required.

It will be understood that the disks 8 may be readily assembled in proper relation to the ball member 6 and then quickly and easily placed in position between the vise jaws 5 so as to be supported by the latter as shown in Figure 1. Although simple in construction, the present attachment is positive and durable. The ball member 6 being made of hardened steel, and the socket-forming disks 8 being made of relatively soft metal, insures a positive grip and long service. It is to be understood that the term "ball member" as used herein, is intended to cover a complete ball, a part of a ball, or any like member suitable for use as the male member of a universal connection or mounting.

What I claim as new is:

1. A universal work-holding attachment for vises comprising a U-shaped frame having outturned flanges arranged to rest upon the jaws of a vise, the legs of said frame being arranged to engage the faces of said vise jaws, disks carried on the inner sides of the legs of said frame and provided with concavo-spherical recesses in the inner faces thereof, a ball member arranged between and having its opposite sides received within the recesses of said disks, said ball member having a shank rigid therewith and projecting therefrom, and a work-holder carried by said shank.

2. A universal work-holding attachment for vises comprising a U-shaped frame having outturned flanges arranged to rest upon the jaws of a vise, the legs of said frame being arranged to engage the faces of said vise jaws, disks carried on the inner sides of the legs of said frame and provided with concavo-spherical recesses in the inner faces thereof, a ball member arranged between and having its opposite sides received within the recesses of said disks, said ball member having a shank rigid therewith and projecting therefrom, and a work-holder carried by said shank, said shank being of hollow form, and said work holder having a projecting threaded stem detachably engaged in said shank.

WILLIAM H. NEAL.